(No Model.) 5 Sheets—Sheet 1.

W. R. WILLETTS & R. T. LEWIS, Jr.
MACHINE FOR HEADING DOWN RIVETS OF BICYCLE CHAINS.

No. 550,116. Patented Nov. 19, 1895.

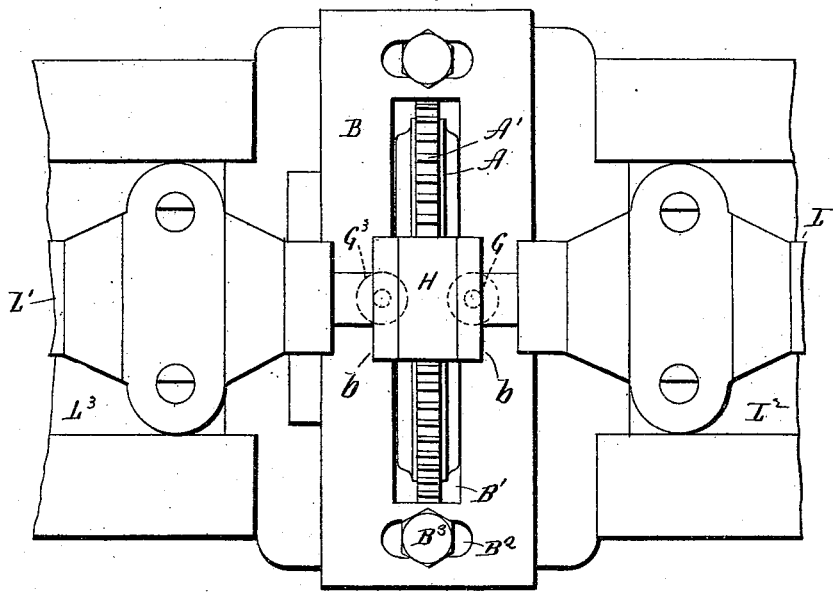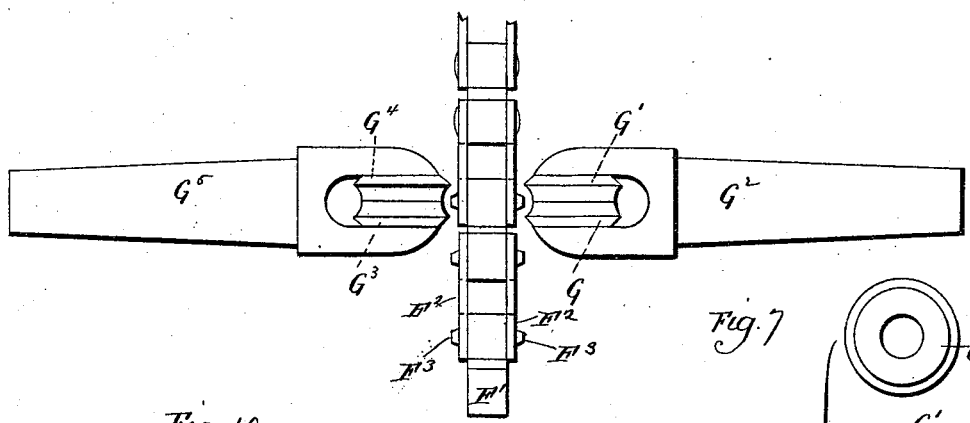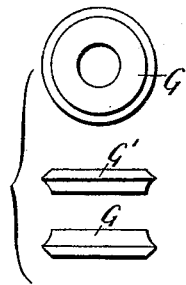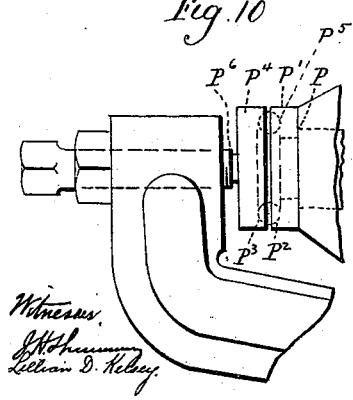

(No Model.) 5 Sheets—Sheet 3.

W. R. WILLETTS & R. T. LEWIS, Jr.
MACHINE FOR HEADING DOWN RIVETS OF BICYCLE CHAINS.

No. 550,116. Patented Nov. 19, 1895.

(No Model.) 5 Sheets—Sheet 4.
W. R. WILLETTS & R. T. LEWIS, Jr.
MACHINE FOR HEADING DOWN RIVETS OF BICYCLE CHAINS.
No. 550,116. Patented Nov. 19, 1895.
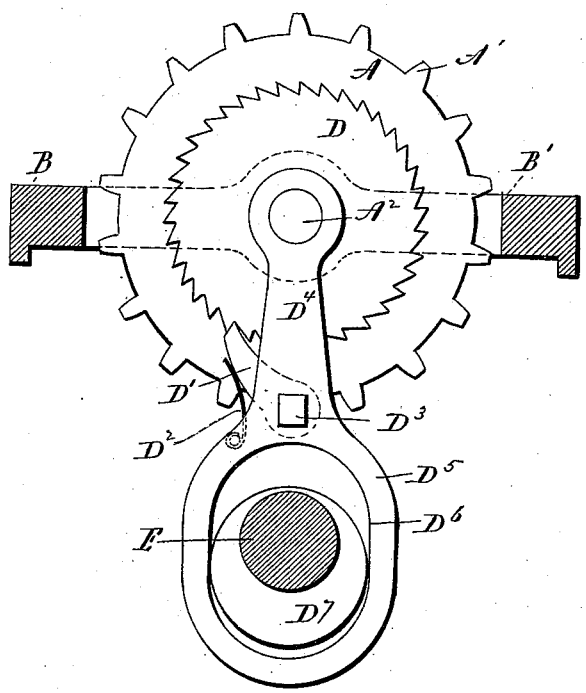
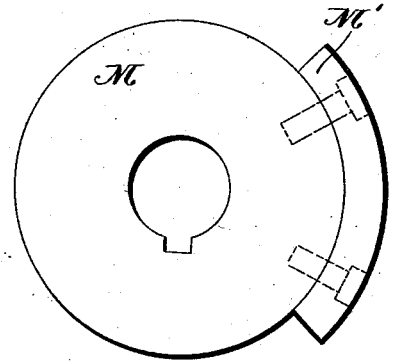
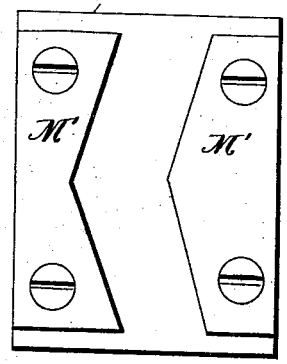

(No Model.) 5 Sheets—Sheet 5.
W. R. WILLETTS & R. T. LEWIS, Jr.
MACHINE FOR HEADING DOWN RIVETS OF BICYCLE CHAINS.
No. 550,116. Patented Nov. 19, 1895.
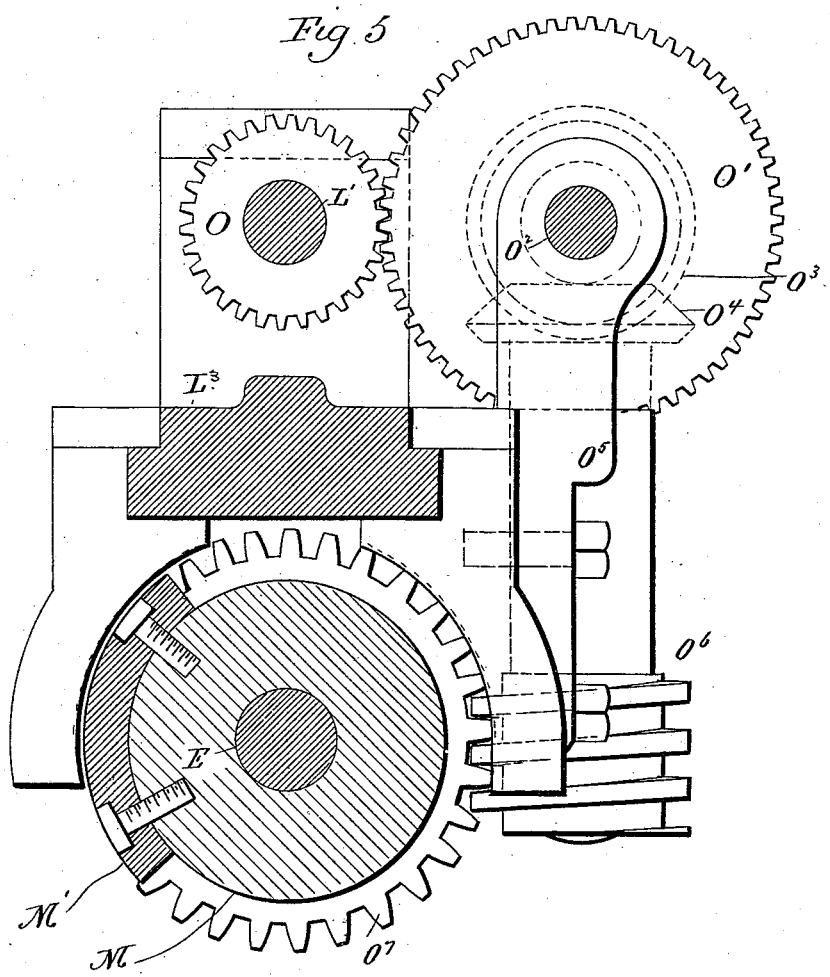

UNITED STATES PATENT OFFICE.

WILLIAM R. WILLETTS AND ROBERT T. LEWIS, JR., OF WATERBURY, CONNECTICUT, ASSIGNORS TO THE AMERICAN PIN COMPANY, OF SAME PLACE.

MACHINE FOR HEADING DOWN RIVETS OF BICYCLE-CHAINS.

SPECIFICATION forming part of Letters Patent No. 550,116, dated November 19, 1895.

Application filed June 26, 1895. Serial No. 554,087. (No model.)

*To all whom it may concern:*

Be it known that we, WILLIAM R. WILLETTS and ROBERT T. LEWIS, Jr., of Waterbury, in the county of New Haven and State of Connecticut, have invented a new Improvement in Machines for Heading Down the Rivets of Bicycle-Chains; and we do hereby declare the following, when taken in connection with the accompanying drawings and the letters of reference marked thereon, to be a full, clear, and exact description of the same, and which said drawings constitute part of this specification, and represent, in—

Figure 1:
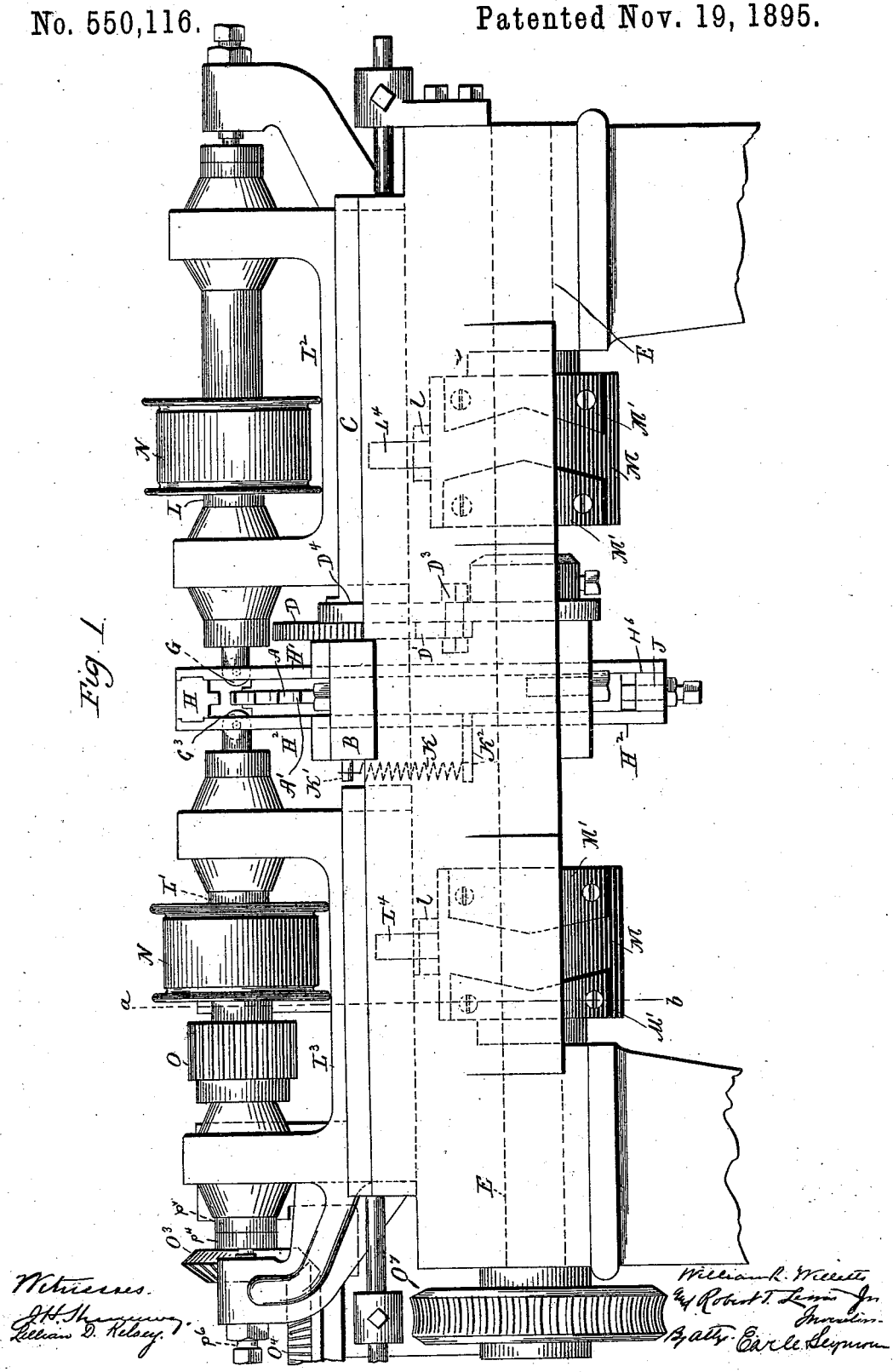
Figure 3:
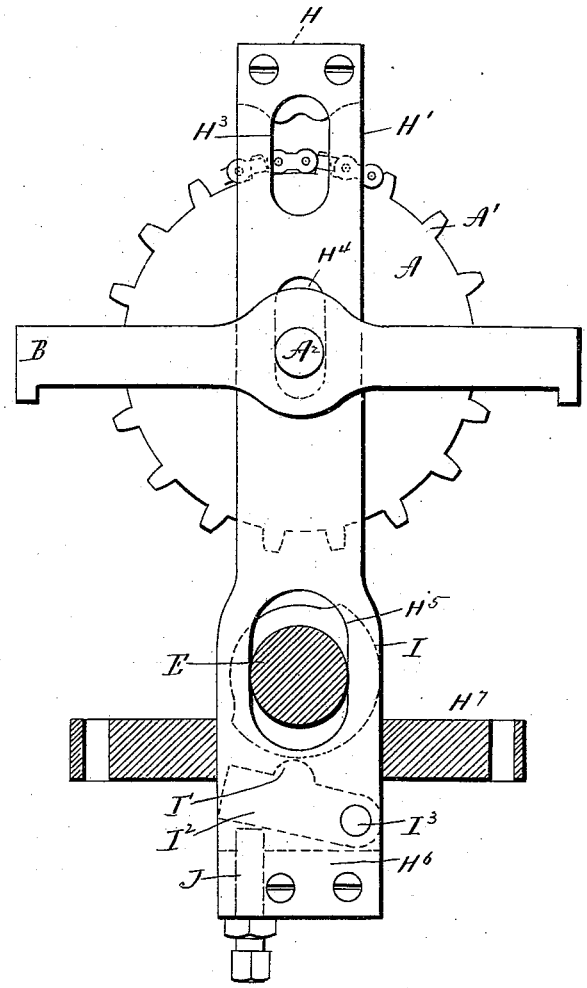

Figure 1, a view in side elevation of one form which a machine constructed in accordance with the invention may assume; Fig. 2, a broken view showing the central portion of the machine; Fig. 3, a view, partly in elevation and partly in vertical transverse section, showing the sprocket-wheel, the carrier-block therefor, the upper or gripping die, and the reciprocating frame in which the same is mounted; Fig. 4, a similar but less comprehensive view showing the sprocket-wheel and the means for intermittently actuating the same; Fig. 5, an enlarged view in vertical section on the line $a\,b$ of Fig. 1, showing the gearing connecting one of the spindles with the driving-shaft of the machine; Fig. 6, a detached plan view showing the two chucks carrying the respective pairs of spinning-rolls with a section of a bicycle-chain between the same; Fig. 7, a view showing a pair of rolls in side elevation and in plan; Fig. 8, a detached end view of one of the cam-block drums; Fig. 9, a side view thereof; Fig. 10, a detached sectional view of one of the end-thrust ball-bearings.

This invention relates to an improved automatic machine for heading down the rivets of bicycle-chains, the object being to produce a simple and effective machine having a large capacity for work and constructed with particular reference to feeding the chains automatically after they are once entered into the machine.

With these ends in view the invention consists in an automatic riveting-machine, the feeding and holding mechanism whereof comprises a sprocket-wheel constructed and arranged to have the chains engaged with its sprockets and to feed them automatically after they have once been engaged with it.

The invention further consists in certain details of construction and combinations of parts, as will be hereinafter described, and pointed out in the claims.

At the outset of this description it may be mentioned that the machine now to be described is an improvement upon that shown in a pending application filed under date of February 4, 1895, and serially numbered 537,220.

In carrying out the present invention, as herein shown, a sprocket-wheel A, having sprockets A', is employed for automatically feeding the chains after the same have once been engaged with it, and for in part supporting them during the heading down thereof. This wheel has, therefore, in the machine shown, the twofold function of a feeding device and a lower or supporting die. It is mounted for rotation upon a short horizontally-arranged shaft $A^2$, journaled at its ends in a carrier-block B, which is constructed with a longitudinal opening B' for the reception of the wheel. The ends of this block are constructed with transversely arranged elongated slots $B^2 B^2$, located adjacent to and in line with the ends of the said opening B' and receiving screw-bolts $B^3 B^3$, by means of which the block is secured to the machine-bed C, with capacity for lateral adjustment thereupon. The said sprocket-wheel is intermittently rotated through the medium of a ratchet-wheel D, also mounted upon the shaft $A^2$, and having its teeth engaged by means of a pawl D', held in engagement with the teeth of the wheel by a spring $D^2$ and hung upon a stud $D^3$, mounted in a depending oscillating lever $D^4$, hung by its upper end from the shaft $A^2$ as a center. The lower end of this lever is enlarged, as at $D^5$, and formed with a vertically-elongated opening $D^6$, receiving an eccentric $D^7$, mounted upon the driving-shaft E. The revolution of the said eccentric within the said slot imparts an oscillating movement to the lever of sufficient range to successively engage the pawl D' with the teeth of the ratchet-wheel D, whereby the sprocket-wheel A is rotated intermittently or step by step. It is to be understood that the side plates F, the links F', and the rivets F² of the chains are assembled together in long lengths before the chains are engaged with the sprocket-wheel, the sprockets of which enter between the adjacent ends of the links. Then as the wheel turns a new rivet is each time brought into range with the spinning-rolls, of which there are two pairs, the rolls G and G' of one pair being mounted in the chuck G², and the corresponding rolls G³ and G⁴ of the other pair being mounted in the chuck G⁵. Before, however, the ends of the rivets are spun down and headed by the action of the spinning-rolls, the chain is firmly crowded down and held upon the sprocket-wheel by means of an upper or gripping-die H, mounted in the upper end of a vertically reciprocating frame comprising two corresponding slides H' H², respectively, located on opposite sides of the sprocket-wheel A, extending above the same and passing downward through recesses $b$ $b$, formed in the carrier-block B, and leading out of the side walls of the long opening B' formed therein for the reception of the sprocket-wheel. At their upper ends these slides are constructed with chuck-openings H³, of which one is shown in Fig. 3, the said openings being provided to permit the chucks to have access to the chains carried by the sprocket-wheel, which is located, as before mentioned, between the slides. Each slide is also constructed with a vertically-arranged clearance-slot H⁴, of which one is shown in Fig. 3, for clearing the shaft A² of the sprocket-wheel. Each slide is also furnished with a vertically-elongated slot H⁵, of which one is shown in Fig. 3, for clearing the driving-shaft E. The vertically-reciprocating frame, which is mainly composed of these slides, is drawn positively downward for causing the upper or gripping-die H to be drawn solidly down upon the chain carried by the sprocket-wheel, by means of a cam I, mounted on the driving-shaft E and engaging with the toe I' of a shoe I², which is hung upon a stud I³, the ends of which are supported in the respective slides H' and H². The said shoe is vertically adjusted, as may be required, to change the vertical movement of the frame, by means of a set-screw J, engaging with its under face and mounted in a cross-piece H⁶, which connects the extreme lower ends of the slides. The upper end of the said reciprocating frame is supported and guided by the carrier-block, which is recessed to receive its slides, as before mentioned, while its lower end is guided by means of a horizontally-arranged guiding-block H⁷ (shown in Fig. 3) and bolted to the lower face of the bed C of the machine. For lifting the frame to lift the upper or gripping die H off the chain and permit the same to be fed forward again, a stiff spiral spring K is provided, the upper end of which is secured to a stud K', projecting from the carrier-block B, and the lower end of which is fastened to a longer stud K², mounted in the slide H². In place, however, of using the spring for lifting the reciprocating frame, the cam I may be utilized for the purpose by providing the frame with some abutment at a point above the cam for the same to work against, or a separate cam might be employed for lifting the frame.

The chucks G² and G⁵ are respectively mounted in spindles L and L', mounted in carriages L² and L³, arranged to slide simultaneously toward and away from each other on the machine-bed C, to which they are attached in any approved manner. For the described operation of the carriages, each carriage is provided with a depending stud L⁴, carrying an antifriction-roller $l$. Two drums M M, mounted upon the driving-shaft under the said carriages, are each provided with two double-beveled cam-blocks M' M', which engage the respective friction-rollers $l$ $l$, carried by the studs in such a manner as to simultaneously and positively move the carriages, and hence the spindles and chucks and spinning-rolls, toward and away from each other. The movement thus imparted to the carriages is designed to be simply sufficient to spin down the ends of the rivets and to clear the same for feeding. It is preferred to move both of the chucks as described, but that is not essential, inasmuch as the machine will be operative if only one is moved, as shown in the prior application referred to.

Each spindle is provided with a driving-pulley N N, receiving impulse from any convenient source of power.

For driving the driving-shaft E we provide the spindle L' with a pinion O, meshing into a large gear O', mounted on the same shaft O², with a bevel-gear O³, meshing into a bevel-gear O⁴, mounted on a shaft O⁵, carrying at its opposite end a worm O⁶, taking into a worm-wheel O⁷, mounted on the said shaft E, which is thus driven. The invention is not limited, however, to driving the shaft E as described, as it might be geared in some other manner with one of the two spindles or might be driven entirely independently of either of them. The mode of gearing described, however, is found compact, convenient, and effective.

On account of the severe end-thrust of the spindles it is preferred to locate antifriction-bearings at their ends, as shown in Figs. 1 and 10. For this purpose the outer end of each spindle is reduced to form a shoulder P for the reception of a collar P', the outer face of which has a shallow annular groove of semicircular cross-section formed in it. The said groove P² co-operates with a corresponding shallow annular groove P³, located in the inner face of a disk P⁴ to form a runway for antifriction-balls P⁵, the disk P⁴ being supported at the inner end of an adjustable end-thrust screw P⁶, mounted in the frame of the machine and entering the outer face of the said disk. The end-thrust ball-bearing just described has been found extremely effective; but the invention is not limited to its use, or, indeed, to the use of any bearing of like character.

In the operation of the machine a long chain, the rivets of which are not headed, is engaged at one end with the sprockets of the sprocket-wheel and the machine started in motion, after which the sprocket-wheel automatically presents the rivets one by one to the action of the spinning-rolls until every rivet in the chain has been presented. The only attention that the machine requires, therefore, is to start the long lengths of chain into it, after which it takes care of itself. It will thus be seen that the machine operates with a great economy of labor over those machines in which it is necessary to feed each rivet manually, or to manually attend to the presentation of each rivet between the spinning-rolls. The respective pairs of the spinning-rolls are rotated in opposite directions, while the rolls of each pair are also rotated in opposite directions, as fully set forth in the prior application referred to.

In view of the changes herein suggested and of others which may be obviously made it will be understood that the invention is not limited to the particular construction shown and described, but comprehends such variations therefrom as fairly fall within its spirit and scope.

Having fully described the invention, what is claimed as new, and desired to be secured by Letters Patent, is—

1. In a machine for heading down the rivets of bicycle-chains, the combination with two pairs of spinning rolls, one of which is movable toward and away from the other, of an automatic chain-feeding mechanism located between the said pairs of rolls, and constructed and arranged to feed a chain between them to simultaneously present the opposite ends of its rivets to the spinning action of the rolls and to hold the chain firmly while its rivets are being headed down thereby, the said mechanism including two chain-holders, one of which is movable toward and away from the other, substantially as described.

2. In a machine for heading down the rivets of bicycle-chains, the combination with two pairs of spinning-rolls, one of which is movable toward and away from the other, of a chain-feeding mechanism for automatically feeding a chain between the rolls, and including a sprocket-wheel located between the rolls and adapted to have the chain engaged with its teeth, and constituting one of the supports or holders for the chain while the rivets thereof are being headed down by the rolls, substantially as described.

3. In a machine for heading down the rivets of bicycle-chains, the combination with two pairs of spinning rolls, one of which is movable toward and away from the other; of a sprocket wheel constructed to have a bicycle chain engaged with its sprockets, and arranged to form a die for supporting the chain while being subjected to the action of the rolls and to feed the chain automatically; and another die movable toward and away from the sprocket-wheel for gripping the chain thereupon, substantially as described.

4. In a machine for heading down the rivets of bicycle chains, the combination with two pairs of spinning rolls, one of which is movable toward and away from the other, of a sprocket-wheel arranged to feed a chain between the rolls to successively present the rivets of the chain thereto, and a vertically movable frame carrying a gripping die which is drawn down upon the chain to assist in holding it while its rivets are being spun down by the action of the spinning-rolls substantially as described.

5. In a machine for heading down the rivets of bicycle-chains, the combination with two pairs of spinning rolls, one of which is movable toward and away from the other, of a sprocket-wheel constructed to have a chain connected with its sprockets, a carrier-block in which the wheel is mounted, an upper or gripping die for forcing the chain down upon the wheel for holding it during the spinning action of the rolls, and a vertically movable frame for carrying the said die, comprising two slides which are supported at their upper ends in the carrier-block, substantially as described.

6. In a machine for heading down the rivets of bicycle-chains, the combination with one of the spinning spindles thereof having its outer end reduced to form a shoulder, of a collar abutted against the said shoulder and having a shallow annular groove formed in its outer face, a disk having a shallow annular groove formed in its inner face to coact with the groove before mentioned to form a run-way for anti-friction balls, and an adjustable end-thrust screw mounted in the frame of the machine and entering the outer face of the said disk for supporting the same in position to take the end-thrust of the spindle, substantially as described.

In testimony whereof I have signed this specification in the presence of two subscribing witnesses.

WILLIAM R. WILLETTS.
ROBERT T. LEWIS, JR.

Witnesses:
MARIE E. HORN,
A. B. JENKINS.